United States Patent [19]

Valbonesi et al.

[11] 3,928,725

[45] Dec. 23, 1975

[54] PAM/PCM INTERFACE NETWORK FOR TDM TELECOMMUNICATION SYSTEM

[75] Inventors: Giuseppe Valbonesi; Roberto Camiciottoli, both of Milan, Italy

[73] Assignee: Societa Italiana Telecomunicazion Siemens S.p.A., Milan, Italy

[22] Filed: Nov. 12, 1974

[21] Appl. No.: 523,145

[30] Foreign Application Priority Data

Nov. 12, 1973 Italy .................................. 31186/73

[52] U.S. Cl......... 179/15 AA; 179/15 A; 179/15 AP

[51] Int. Cl.² ........................................... H04J 3/04

[58] Field of Search......... 179/15 A, 15 AT, 15 AP, 179/15 AA

[56] References Cited

UNITED STATES PATENTS 3,761,633 9/1973 Schlichte........................ 179/15 AA

*Primary Examiner*—Ralph D. Blakeslee

*Attorney, Agent, or Firm*—Karl F. Ross; Herbert Dubno

[57] ABSTRACT

At a central office communicating with a remote exchange via a PCM link carrying recurrent frames of 32 channels each, a coupler comprises 30 parallel circuit branches for exchanging analog-voltage samples between as many local lines and a PCM terminal. Each branch includes a tuned circuit for resonant transfer of voltage samples between a storage capacitor, individual to a local line, and the PCM link which contains an A/D converter or coder in an outgoing path and a D/A converter or decoder in an incoming path. The tuned circuit of each branch comprises two filter sections in cascade, each with a shunt condenser, separated by a normally open circuit breaker which closes once per scanning cycle, i.e. in a time slot (No. 0) immediately preceding a series of 15 time slots in the first half of this 32-slot cycle for the first 15 branches and in another time slot (No. 16) immediately preceding another series of 15 time slots in the second half thereof for the second 15 branches. A transmit switch individual to each branch discharges the terminal-side shunt condenser thereof into a common storage capacitor for delivery of its sample to the coder; an associated receive switch closes less than half a cycle thereafter to charge that condenser from the output of the decoder. As the operating frequencies of the groups of transmit and receive switches are not exactly identical, a delay circuit in the incoming path with a delay time of half a cycle is cut either in or out and the closure times of the receive switches are retarded or advanced to the same extent by a monitoring unit whenever the deviation between corresponding switch-closing phases reaches a predetermined limit. Binary supervisory signals, registered in circulating caller and responder memories, are exchanged in the 16th time slot between a processor and the PCM terminal over paths bypassing the coupler.

10 Claims, 8 Drawing Figures

PAM/PCM INTERFACE NETWORK FOR TDM TELECOMMUNICATION SYSTEM

FIELD OF THE INVENTION

Our present invention relates to a telephone or other telecommunication system of the time-division-multiplex (TDM) type and, more particularly, to an interface network for exchanging messages between a pulse-amplitude-modulation (PAM) part and a pulse-code-modulation (PCM) part of the system.

BACKGROUND OF THE INVENTION

In a system in which several exchanges or central offices each serving a multiplicity of local lines are interconnected by PCM links, e.g. as described in commonly owned U.S. Pat. No. 3,749,839, messages such as voice signals from subscribers served by a central office may be periodically sampled in a recurrent scanning cycle to produce a succession of analog-voltage pulses which are temporarily stored for conversion into binary codes suitable for transmission over an outgoing path of an inter-office PCM link or trunk line. Conversely, bits received over an incoming path of such link are converted into analog voltages for retransmission via respective local lines to the subscribers for which they are intended. If each local line is permanently assigned to a particular channel of a PCM frame, individual A/D converters or coders at the transmitting end and D/A converters or decoders at the receiving end are required for each channel.

OBJECTS OF THE INVENTION

The general object of our invention, therefore, is to provide an interface network for such a system enabling random coupling of local lines, sampled in the PAM mode, to available channels of a PCM frame in an inter-office link.

A more particular object is to provide means in such an interface network for facilitating the transfer of messages between the PAM and PCM parts thereof even if these two parts do not operate in perfect synchronism.

SUMMARY OF THE INVENTION

We realize these objects, in accordance with our present invention, by the provision of a coupler between a PAM sampling circuit for the local lines served by a central office and a PCM link extending from that central office to a remote exchange, this coupler having a plurality of parallel branches each including a pair of cascaded sections for the temporary storage of a message sample. One section of each branch is periodically connectable to the sampling circuit for communication with an assigned local line and is normally isolated from the other section by a circuit breaker individual to that branch. This other section is alternately connectable to the outgoing and the incoming path of a PCM link by momentary closure of a transmit switch and a receive switch, respectively, the circuit breakers and the transmit switches being actuatable by locally controlled first timing means whereas the receive switches are actuatable by second timing means controlled from the remote exchange via the PCM link. Generally, the operating frequencies of these first and second timing means will be fundamentally the same but subject to relative phase shifts due to imperfect synchronization and delays in transmission; we therefore provide monitoring means for relatively phase-shifting the two timing means upon a deviation of the relative closure times of the transmit and receive switches from a predetermined range in order to maintain an invariable closure sequence in each branch.

Advantageously, the two sections of each branch are tuned circuits with respective shunt condensers which are chargeable one from the other by the technique of resonant transfer as described in commonly owned U.S. Pat. Nos. 3,588,366 and 3,499,119. Resonant transfer may then also be carried out between one of these condensers and an individual storage capacitor for the message samples of the assigned local line as well as between the other condenser and a common storage capacitor in the input coder of the outgoing PCM path.

In a preferred embodiment of our invention, the number of available time slots in a scannong cycle exceeds the number of branches in the coupler, the circuit breakers between the branch sections being closable in a time slot other than those during which the transmit switches are closed. For reasons explained hereinafter, the branches should be divided into two substantially equal groups, the circuit breakers of one group being closable in a time slot immediately preceding a series of time slots during which the transmit switches of this group are successively closed whereas the circuit breakers of the other group are closable in a time slot immediately preceding a series of time slots during which the remaining transmit switches are successively closed.

In a system of this latter construction, pursuant to a further feature of our invention, a guard signal generated under the control of the first timing means lasts for substantially half a scanning cycle and is fed, together with a closure pulse for one of the receive switches generated by the second timing means, to a coincidence circuit forming part of the monitoring means, the latter further including a phase-shifting circuit for the second timing means and a delay circuit selectively insertable in the incoming path of the PCM link under the control of the coincidence circuit. The coincidence circuit advantageously includes memory means for ineffectually preserving a phase-shift instruction until the appearance of an execution signal in a predetermined time position of one frame in a recurrent sequence of PCM frames.

BRIEF DESCRIPTION OF THE DRAWINGS

The above and other features of our invention will now be described in detail with reference to the accompanying drawing in which.

SPECIFIC DESCRIPTION

Figure 1:
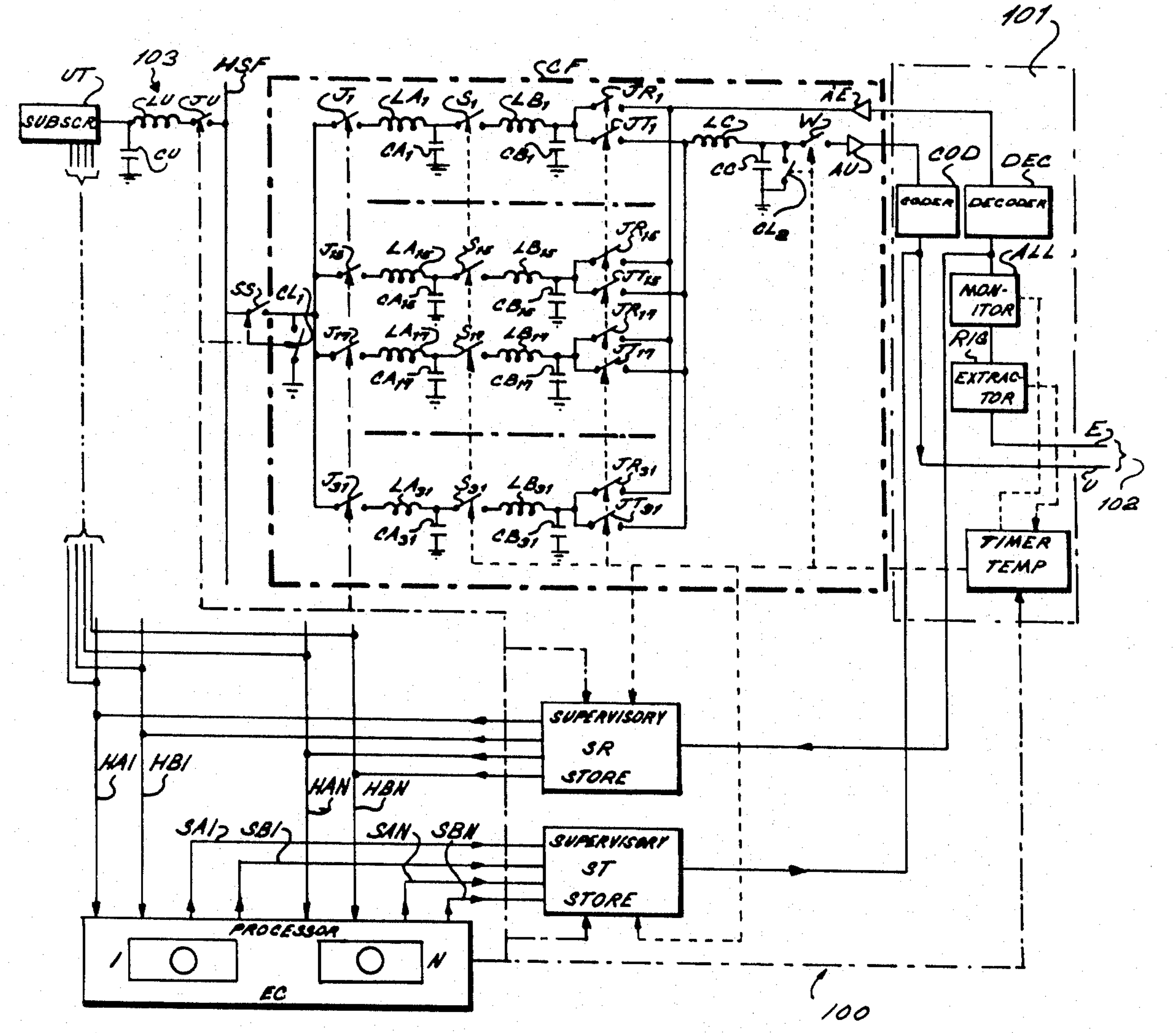
FIG. 1 is a circuit diagram showing part of a PDM central office equipped with an interface network according to our invention.

In FIG. 1 we have shown part of a telephone exchange 100 serving a multiplicity of subscribers via a number of local lines, one of them having been indicated at UT. It will be understood that these local lines need not be permanently connected to the associated subscriber stations but may be only temporarily allocated thereto by conventional central-office equipment not further illustrated. The system here described has 30 such lines adapted to communicate with as many lines served by a remote central office of exchange of similar construction connected to the central office 100 by way of a PCM terminal 101 and a two-way PCM link or trunk line 102 including an outgoing path U and an incoming path E. Within a scanning cycle of 125 $\mu$s, in which a sampling circuit 103 collects message samples in the form of instantaneous analog voltages from all active lines of the group, link 102 carries a PCM frame of 32 channels, i.e. 30 speech channels and two service channels; 16 consecutive frames are combined into a multiframe (or superframe) sequence serving to convey supervisory information in a manner described hereinafter.

The 30 lines here considered may form part of a larger group scanned at a rate of, say, 80 lines in a 125-$\mu$s cycle; the remaining lines of that group may be used for communication among local subscribers, for example, and are of no further interest in the present context. Scanning is carried out under the control of a processor EC which comprises several circulating memories, e.g. as disclosed in commonly owned U.S. Pat. Nos. 3,581,016 and 3,828,136, including a caller memory I and a responder memory N. The address of a calling party is entered in an available phase of the caller memory I whereupon that of the called party is inscribed in a corresponding phase of responder memory N. In the present instance, the address of either the calling or the called party is an identification of one of the 30 speech channels of a PCM frame assigned to the connection between the local subscriber and a remote station.

The speech signals originating at or destined for each local line UT are temporarily stored, during each cycle, on an individual line capacitor CU forming part of a sampling circuit 103, the capacitor CU being tuned to resonance at the sampling frequency by an inductance LU in series with an individual line switch JU giving access to a common bus bar HSF; the connection between sampling circuit 103 and PCM terminal 101 includes a master switch SS and a coupler CF. Switch SS closes, up to 30 times per scanning cycle, whenever a phase of either of the two circulating memories I, N contains the address of one of the PCM speech channels accessible through coupler CF, this closure coinciding with that of one of 30 switches $J_1$–$J_{15}$ and $J_{17}$–$J_{31}$ in respective parallel two-way branches of coupler CF. Each branch includes a pair of cascaded tuned sections with shunt condensers $CA_1$–$CA_{15}$, $CA_{17}$–$CA_{31}$ and associated series inductances $LA_1$–$LA_{15}$, $LA_{17}$–$LA_{31}$ on the local or or PAM side (left) and with shunt condensers $CB_1$–$CB_{15}$, $CB_{17}$–$CB_{31}$ and associated series inductances $LB_1$–$LB_{15}$, $LB_{17}$–$LB_{31}$ on the PCM side (right), the two sections being separated by circuit breakers $S_1$–$S_{15}$ and $S_{17}$–$S_{31}$ acting as transfer switches. The reopening of each switch JU and the corresponding switch $J_1$–$J_{15}$ or $J_{17}$–$J_{31}$, identified by the stored channel address, is immediately followed by the momentary closure of a shunt switch $CL_1$, serving to discharge residual energy from the preceding connection, in a guard interval between successive memory phases.

Each of the branches of coupler CF further includes, in its right-hand section, a pair of switches serving to connect its shunt condenser $CB_1$–$CB_{15}$, $CB_{17}$–$CB_{31}$ to the outgoing path U and the incoming path E, respectively, of PCM link 102. Thus, there are 30 transmit switches $JT_1$–$JT_{15}$, $JT_{17}$–$JT_{31}$ and as many receive switches $JR_1$–$JR_{15}$, $JR_{17}$–$JR_{31}$. The transmit switches lead through a series inductance LC to a storage capacitor CC, forming therewith another resonant circuit, which is periodically connectable via an output switch W and an amplifier AU to the input of an analog/digital converter or coder COD translating the successive amplitude samples into 8-bit words to be transmitted to a remote exchange via trunk 102. The incoming path E of that trunk includes a digital/analog converter or decoder DEC which reconstitutes the original voltage samples from the arriving 8-bit words and feeds them through an amplifier AE to the several receive switches in parallel. The capacitor CC is discharged by a shunt switch $CL_2$ shortly after each momentary closure of series switch W. Thus, successive closures of switches $S_1$ etc. and $JT_1$ etc. transfer the charges of the left-hand condensers $CA_1$ etc. to the right-hand condensers $CB_1$ etc. and thence to the common storage capacitor CC to energize the coder COD upon closure of switch W; similarly, successive closures of switches $JR_1$ etc. and $S_1$ etc. transfer the output voltages of decoder DEC first to the right-hand condensers $CB_1$ etc. and thence to their left-hand mates $CA_1$ etc. For proper operation, the maintenance of an invariable order of closure of these switches is essential; more particularly, this order should be circuit brakers $S_1$ etc., transmit switches $JT_1$ etc. and receive switches $JR_1$ etc.

Figure 2:
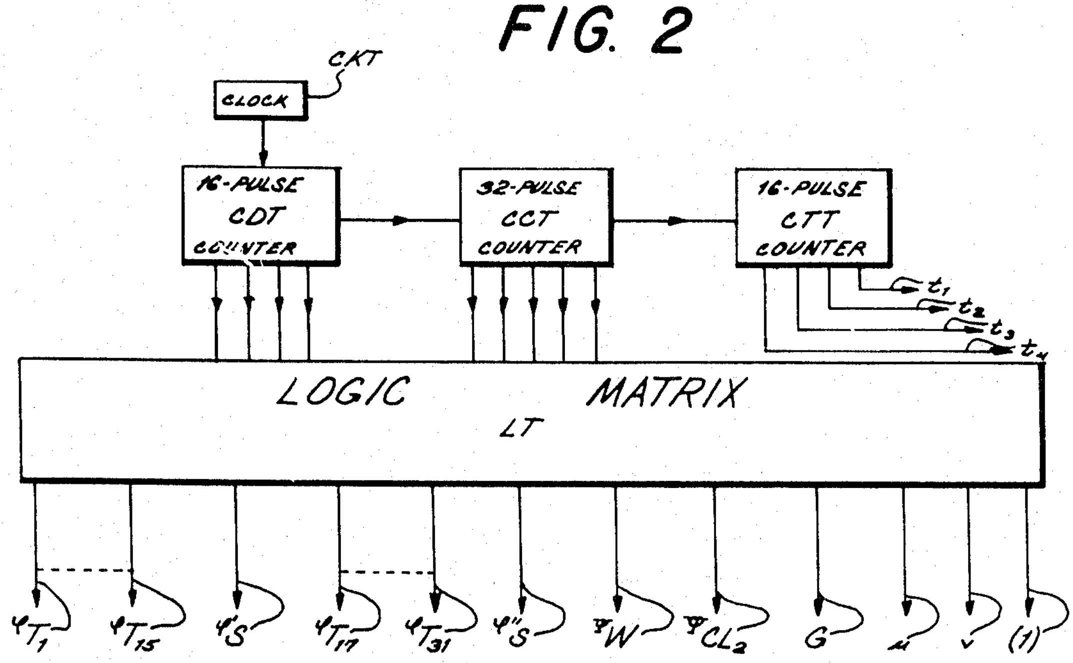
FIG. 2 diagrammatically shows logical circuitry for timing the operation of a transmitting portion of the interface network of FIG. 1.
Figure 3:
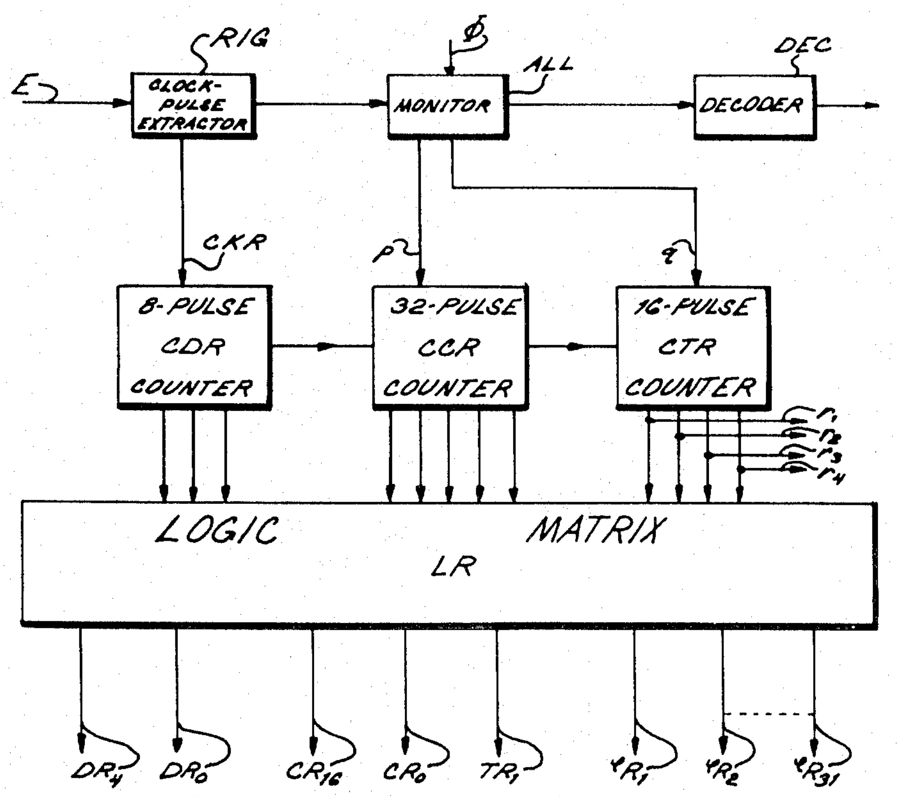
FIG. 3 diagrammatically shows logical circuitry for timing the operation of a receiving portion of the interface network.

The means for controlling these switch closures has been diagrammatically illustrated in FIG. 1 as a timer TEMP in combination with a clock-pulse extractor RIG, the latter being inserted in path E upstream of decoder DEC with interposition of a monitoring circuit ALL therebetween. Details of timer TEMP appear in FIGS. 2 and 3, FIG. 2 showing a first timing means including a local clock CKT which is generally synchronized with a similar clock at the remote exchange by conventional means including frame-counting codes transmitted over the link 102 (see, for example, commonly owned U.S. Pat. No. 3,749,839). Clock CKT steps a 16-pulse bit counter CDT which in turn steps a 32-pulse channel counter CCT, the latter stepping a 16-pulse frame counter CTT. The four stage outputs of counter CDT and the five stage outputs of counter CCT are connected to a logic matrix LT deriving therefrom, inter alia, a number of closure pulses for the switches of coupler CF, i.e. pulses $\phi_{T1}$–$\phi_{T15}$, $\phi_{17}$–$\phi_{31}$ for transmit switches $JT_1$ etc., pulses $\phi'_S$ and $\phi''_S$ for circuit breakers $S_1$–$S_{15}$ and $S_{17}$–$S_{31}$, respectively, a pulse $\Psi_W$ for switch S and a pulse $\Psi_{CL2}$ for switch CL2. The four stage outputs of frame counter CTT, designated $t_1$–$t_4$, are connected to another logic matrix LST shown in FIG. 7. Matrix LT also emits a guard signal G and ancillary signals $u$, $v$ as well as a parity bit [1] whose significance will be described hereinafter.

FIG. 3 shows a second timing means included in circuit TEMP, comprising a group of counters analogous to those of FIG. 2, i.e. an 8-pulse bit counter CDR receiving clock pulses via a line CKR from extractor RIG, a 32-pulse channel counter CCR stepped by bit counter CDR, and a 16-pulse frame counter CTR stepped by channel counter CCR. Counters CCR and CTR are resettable as described below, by monitoring circuit ALL with the aid of signals $p$ and $q$. The three stage outputs of counter CDR, the five stage outputs of counter CCR and the four stage outputs of counter CTR terminate at a logic matrix LR generating closure signals $\phi_{R1}$, $\phi_{R2}$, . . . $\phi_{R31}$ for the receive switches $JR_1$–$JR_{15}$, $JR_{17}$–$JR_{31}$ of coupler CF; this matrix also emits resetting and execution signals $TR_1$, $CR_0$, $CR_{16}$, $DR_0$ and $DR_7$ in certain time positions of a multiframe sequence.

The difference in the number of stages between the two counters CDT (FIG. 2) and CDR (FIG. 3) is due to the fact that coder COD generates 12-bit words and then compresses them to 8 bits, the remaining four clock pulses per channel establishing intervening guard positions; thus, only 8 significant bits per channel are picked up by the extractor RIG to step the counter CDR. It is assumed that counters CCT and CCR are stepped whenever their respective predecessor counters CDT and CDR have a count of 1 and that they, in turn, step the respective frame counters CTT and CTR on their own count of 1, the bit signal $DR_0$ and the channel signal $CR_0$ being thus generated at the end of a channel and of a frame, respectively.

Figure 4:
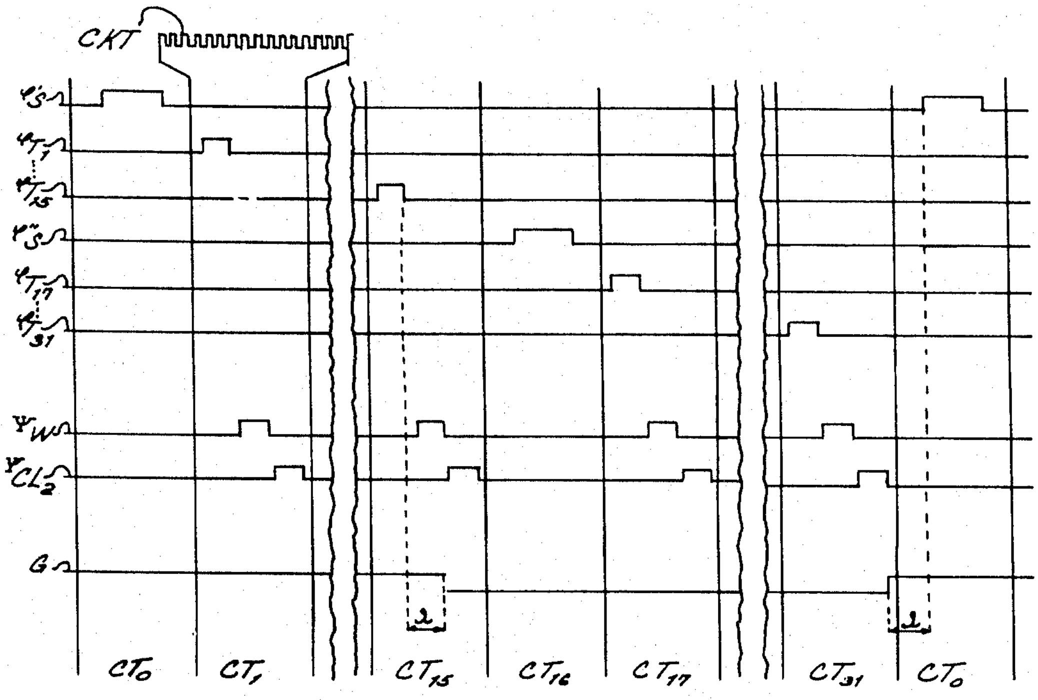
FIG. 4 is a set of graphs serving to explain the operation of the transmitting portion of the network under the control of the circuits of FIG. 2.

Reference will now be made to FIG. 4 showing the sequence in which, within one scanning cycle, the several switch-closing signals for the transmitting portion of coupler CF as well as the guard signal G are emitted by the logic matrix LT of FIG. 2. Thus, signal $\phi'_S$ momentarily closes the circuit breakers $S_1$–$S_{15}$ of a first channel group in a service time slot $CT_0$ immediately preceding 15 communication time slots $CT_1$–$CT_{15}$ in the first half of a scanning cycle in which transmit switches $JT_1$–$JT_{15}$ are successively closed by signals $\phi_{T1}$–$\phi_{T15}$. In another service time slot $CT_{16}$, signal $\phi''_S$ momentarily closes the circuit breakers $S_{17}$–$S_{31}$ of a second group of channels whose transmit switches $JT_{17}$–$JT_{31}$ are then closed in 15 communication time slots $CT_{17}$–$CT_{31}$ forming part of the second half of a scanning cycle. Switches W and $CL_2$ are consecutively closed during each communication time slot immediately after the reopening of the corresponding transmit switch. Guard signal G starts just before the beginning of service slot $CT_0$, its leading edge preceding the signal $\phi'_S$ by a safety interval $\lambda$ equaling one or two bit positions, and terminates a fraction of a time slot before service slot $CT_{16}$, its trailing edge following the switching signal $\phi_{T1}$ by about the same safety interval $\lambda$. This guard signal, therefore, has a length of slightly more than 16½ time slots, or a little over half a scanning cycle.

Figure 5:
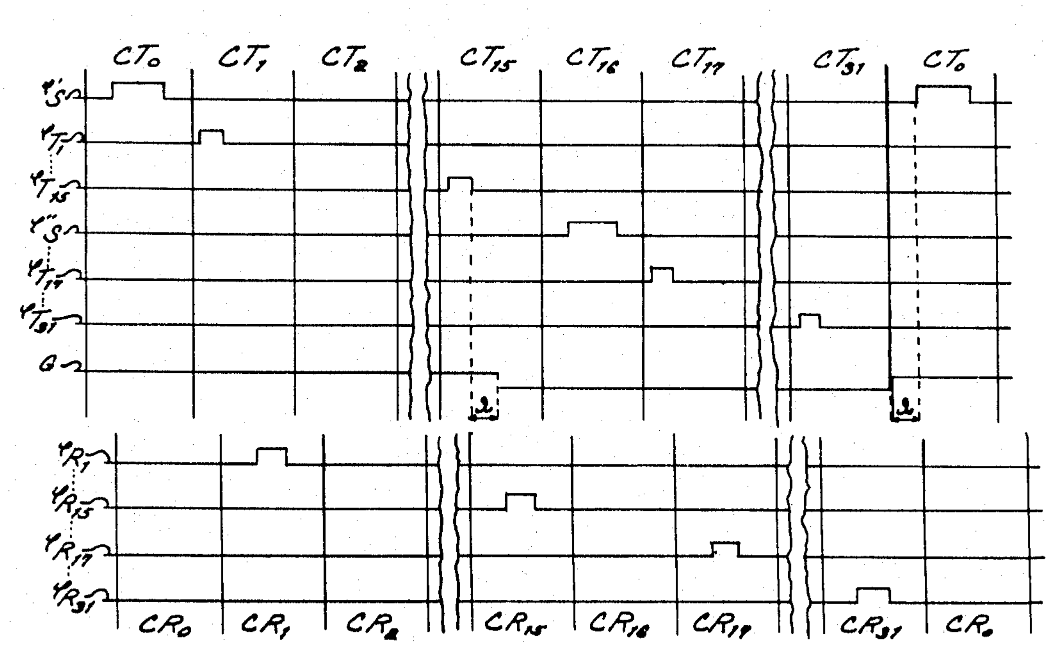
FIG. 5 is a set of graphs similar to that of FIG. 4, illustrating the correlation of the operation of the transmitting and receiving portions of the network.

FIG. 5 illustrates the switch-closing signals as well as the guard signal G of FIG. 4 together with corresponding switch-closing signals $\phi_{R1}$–$\phi_{R15}$, $\phi_{R17}$–$\phi_{R31}$ occurring in staggered relationship within channels $CR_1$–$CR_{15}$ and $CR_{17}$–$CR_{31}$ of an incoming PCM frame which, contrary to the corresponding channels of an outgoing PCM frame, do not necessarily coincide with the time slots of a scanning cycle. FIG. 5 illustrates a position of near coincidence, with a relative offset by a minor fraction of a channel, yet considerably larger phase shifts could occur in actual operation. Since a receive switch such as $JR_{15}$ must not close simultaneously with either the circuit breaker ($S_{15}$) or the transmit switch ($JT_{15}$) of the same branch of coupler CF, the corresponding closure signal ($\phi_{R15}$) has very little leeway to the left of the position illustrated in FIG. 5 but could shift over a considerably wider range to the right before running into the closure signal for the associated circuit breaker. If all the circuit breakers $S_1$–$S_{31}$ were to close at the same time, e.g. under the control of signal $\phi'_S$, signal $\phi_{R31}$ would be free to shift to the right by only a fraction of a channel; thus, the range of permissible relative time displacement between the two sets of closure signals would be extremely narrow. By providing two service channels for the closure of separate groups of circuit breakers at intervals half a frame apart, we greatly increase this range of permissible relative displacement since now the signal $\phi_{R31}$ may shift over as many as 15 channels before encountering the signal $\phi'_S$ for closure of the corresponding circuit breaker; the same freedom exists, of course, for the signal $\phi_{R15}$ with reference to signal $\phi'_S$. Other switch-closing signals need not be considered since their time positions are less critical.

Figure 6:
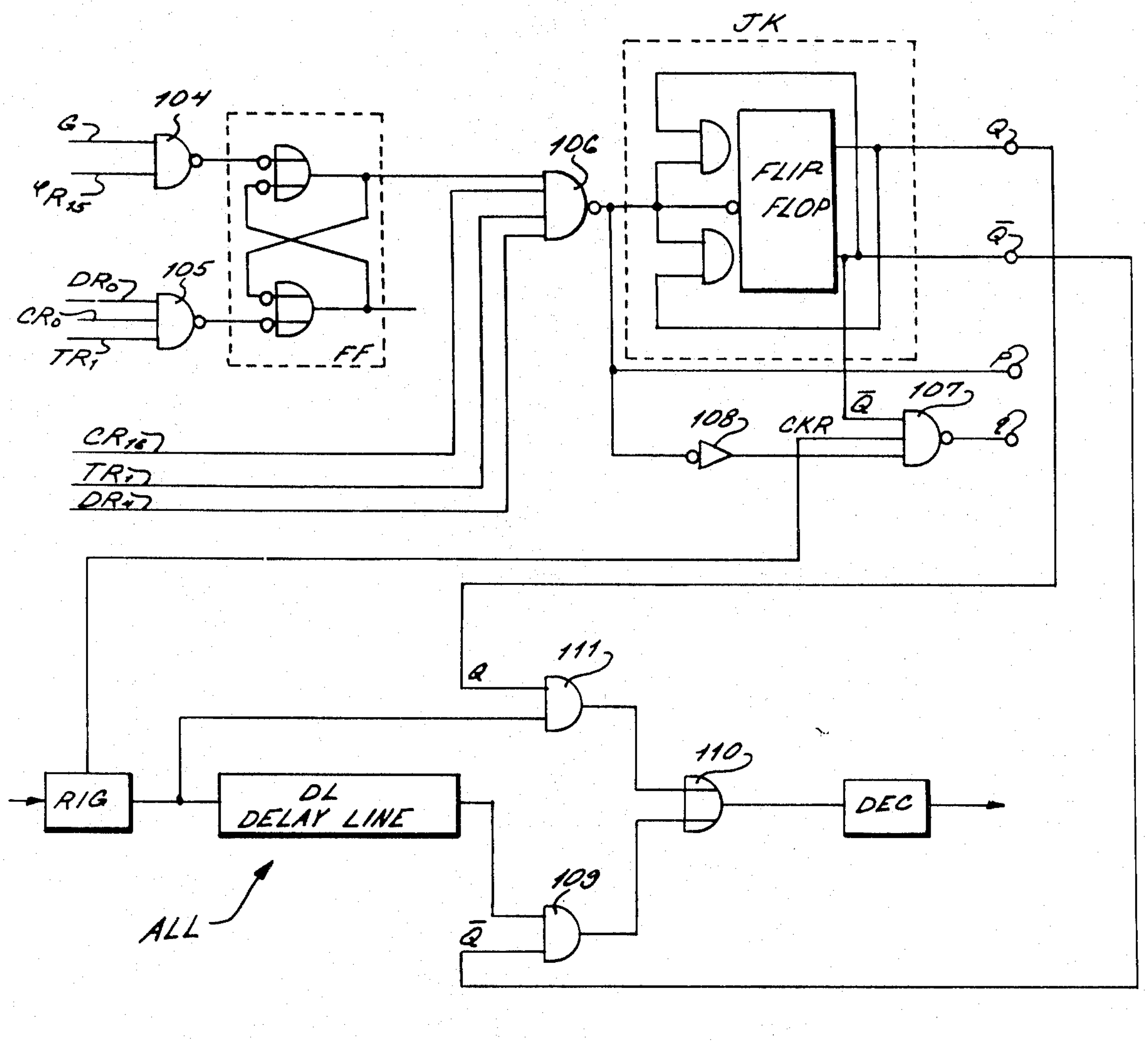
FIG. 6 is a circuit diagram illustrating a monitoring unit forming part of the interface network.

In accordance with our present invention, guard signal G limits the relative shifting of a closure signal for one of the receive switches, here specifically the signal $\phi_{R15}$. Thus, monitoring circuit ALL is designed to test for the coincidence of these two signals and, upon such coincidence, to introduce a relative phase shift of half a frame (substantially equaling half a scanning cycle) to restore the relative timing of the switch closures to their operative range. For this purpose, as shown in FIG. 6, circuit ALL comprises a NAND gate 104 tied to a setting input of a flip-flop FF, this NAND gate receiving the two signals G and $\phi_{R15}$. The resetting input of flip-flop FF is energizable by another NAND gate 105 receiving time-position signals $DR_0$, $CR_0$ and $TR_1$ from logic matrix LR of FIG. 3, the flip-flop being therefore always reset in the middle of the last channel of the first frame of a multiframe sequence. The set output of flip-flop FF terminates at a NAND gate 106 also receiving an execution signal in the form of a combination of signals $CR_{16}$, $TR_1$ and $DR_4$ from matrix LR; thus, the setting of the flip-flop in response to an inadmissible relative shifting of the switch-closing signals becomes effective approximately in the middle of the same first frame of a multiframe sequence. In the case of a 16-frame sequence as herein assumed, pursuant to international CCITT and European CEPT regulations, resynchronization of the clocks once per sequence may entail considerable shifts in between; the aforedescribed grouping of the circuit breakers $S_1$–$S_{15}$ and $S_{17}$–$S_{31}$, however, requires corrective measures to be taken only in the case of large excursions, thereby limiting the loss of information unavoidably accompanying these corrective measures.

As further shown in FIG. 6, NAND gate 106 works into a switching input of a flip-flop JK which is alternately set and reset in response to successive de-energizations of that gate. The reset output $\bar{Q}$ of flip-flop JK is connected to a NAND gate 107 also receiving the clock pulses CKR from extractor RIG as well as the output of gate 106 via an inverter 108. The outputs of gates 106 and 107 are the signals $p$ and $q$, respectively.

shown in FIG. 3.

A digital delay line DL inserted between extractor RIG and decoder DEC can be alternately cut in and cut out in the reset and the set condition, respectively, of flip-flop JK. Thus, line DL works into one input of an AND gate 109 whose other input is connected to the reset output $\bar{Q}$ of the flip-flop and whose output works into an OR gate 110 preceding the decoder DEC; another AND gate 111, also working into OR gate 110, lies in a bypass of line DL and has inputs connected to the output of extractor RIG and to the set output Q of flip-flop JK. A setting of this flip-flop, therefore, shunts out the delay line DL and thereby advances the incoming train of 8-bit words, fed to decoder DEC, by the delay time of line DL which corresponds to half a frame or 128 bits; conversely, the resetting of flip-flop JK makes the line DL effective to introduce a delay of this magnitude.

The disappearance of signal p upon each de-energization of NAND gate 106 resets the counter CCR (FIG. 3) to zero. Since this counter has a count of 16 just before being cleared in this manner, its resetting is tantamount to a shift by half a frame, equal to the delay time of line DL. When that line is shunted out (signal Q), the contents of frame counter CTR remain unchanged so that the change in the count of channel counter CCR constitutes a forward shift; when the line is reinserted (signal $\bar{Q}$), the concurrent suppression of signal $q$ resets the frame counter CTR to zero so as to restart the multiframe sequence.

The establishment of a connection between a local line UT and the remote exchange is accompanied by the generation of supervisory signals in the form of bits entered in corresponding phases of a further circulating memory (not shown) as described in the aforementioned U.S. Pat. Nos. 3,581,016 and 3,828,136. Certain of these supervisory signals, which control the progress and the eventual termination of a call, must also be transmitted to the remote exchange while others originate at that exchange. Some supervisory signals (e.g. dial pulses) are subjected to rapid change and may therefore be referred to as "fast signals" whereas others (e.g. those testing the free or busy condition of a line) vary more gradually and can be referred to as "slow signals". In the system of FIG. 1, processor EC has input leads HAI and HBI supplying fast-signal information and slow-signal information, respectively, concerning a calling party (local subscriber or PCM channel) whose address is inscribed in a phase of memory I; input leads HAN and HBN serve to the same purpose for a called party whose address is inscribed in a phase of memory N. These input leads are fed both by sampling circuit 103 and by a storage circuit SR receiving its information from incoming path E. Outgoing information is sent to path U via a storage circuit ST by way of output leads SAI and SBI, concerning a calling party, and output leads SAN and SBN, concerning a called party.

The following Table illustrates the manner in which fast signals A1–A15, A17–A31 and slow signals B1–B15, B17–B31 for the 30 communication channels of a frame are transmitted over the link 102 in the service channel No. 16 of each of the 16 frames constituting a multiframe sequence, using bits I–III and V–VII of this 16th channel in frames Nos. 1–15. The remaining bit positions IV–VIII of these 15 channels are occupied by parity bits 1. The 16th frame, No. 0, is used to provide a frame count for synchronization purposes in bit positions I–IV; bit position V carries a parity bit 1 whereas bit position VI is used for an off-synchronism bit Φ when the respective clocks at opposite ends of PCM link get out of line. Bit position VII of this frame channel is unused.

| Frame | I | II | III | IV | V | VI | VII | VII |
|---|---|---|---|---|---|---|---|---|
| 1 | A1 | B1 | A8 | 1 | A17 | B17 | A24 | 1 |
| 2 | A2 | B2 | A9 | 1 | A18 | B18 | A25 | 1 |
| 3 | A3 | B3 | A10 | 1 | A19 | B19 | A26 | 1 |
| 4 | A4 | B4 | A11 | 1 | A20 | B20 | A27 | 1 |
| 5 | A5 | B5 | A12 | 1 | A21 | B21 | A28 | 1 |
| 6 | A6 | B6 | A13 | 1 | A22 | B22 | A29 | 1 |
| 7 | A7 | B7 | A14 | 1 | A23 | B23 | A30 | 1 |
| 8 | A8 | B8 | A15 | 1 | A24 | B24 | A31 | 1 |
| 9 | A9 | B9 | A1 | 1 | A25 | B25 | A17 | 1 |
| 10 | A10 | B10 | A2 | 1 | A26 | B26 | A18 | 1 |
| 11 | A11 | B11 | A3 | 1 | A27 | B27 | A19 | 1 |
| 12 | A12 | B12 | A4 | 1 | A28 | N28 | A20 | 1 |
| 13 | A13 | B13 | A5 | 1 | A29 | B29 | A21 | 1 |
| 14 | A14 | B14 | A6 | 1 | A30 | B30 | A22 | 1 |
| 15 | A15 | B15 | A7 | 1 | A31 | B31 | A23 | 1 |
| 0 | X | X | X | X | 1 | φ | 0 | 1 |

Figure 7:
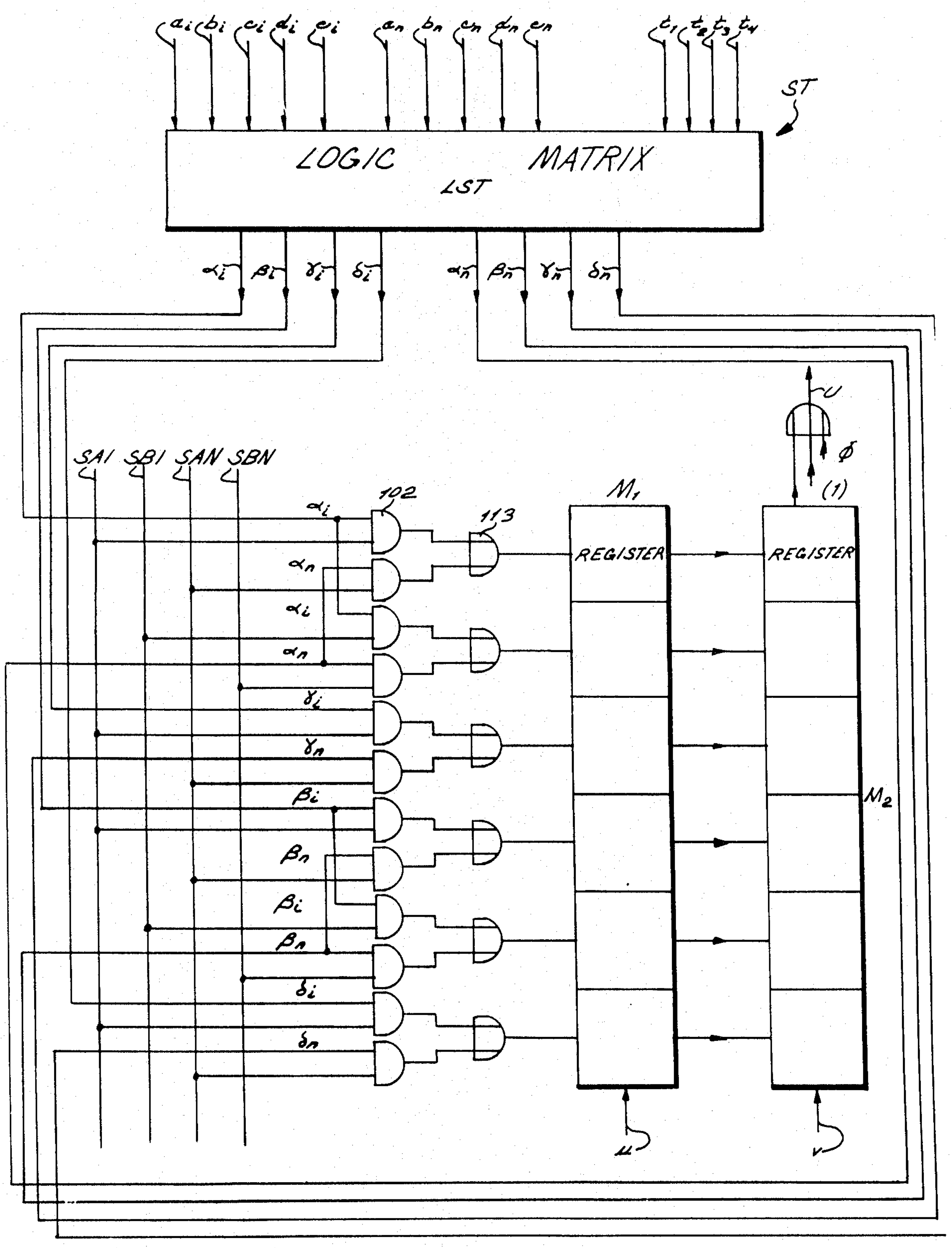
FIG. 7 shows logical circuitry for transmitting supervisory binary signals between the PCM terminal of the central office and a processor associated with the local lines.

A storage circuit ST, as shown in FIG. 7, comprises the aforementioned logic matrix LST with inputs $a_i$–$e_i$ and $a_n$–$e_n$ which identify the number of a calling or a called PCM channel on the basis of the address of that channel read out from a phase of circulating memory I or N, respectively. Matrix LST generates output signals $\alpha_i$, $\beta_i$, $\gamma_i$, $\delta_i$ and $\alpha_n$, $\beta_n$, $\gamma_n$, $\delta_n$, in the various frames according to the preceding Table, under the control of leads $t_1$–$t_4$ originating at the several stages of counter CTT (FIG. 2). The output signals of matrix LST are delivered to a series of AND gates 112 also receiving the signals of leads SAI, SBI, SAN, SBN from processor EC. OR gates 113 load a 6-stage register $M_1$ with the bits listed in the Table, the contents of this register being transferred at the end of each frame under the control of signal $u$ to a similar register $M_2$ which in the 16th channel of the following frame discharges its contents into outgoing path U, under the control of signal $v$, by way of an OR gate 114 which also receives the parity bit [1] from matrix LT and the off-synchronism bit Φ from a comparison circuit SIN (FIG. 8); the latter bit is also fed to monitoring circuit ALL, as shown in FIG. 3, to deactivate same temporarily.

Figure 8:
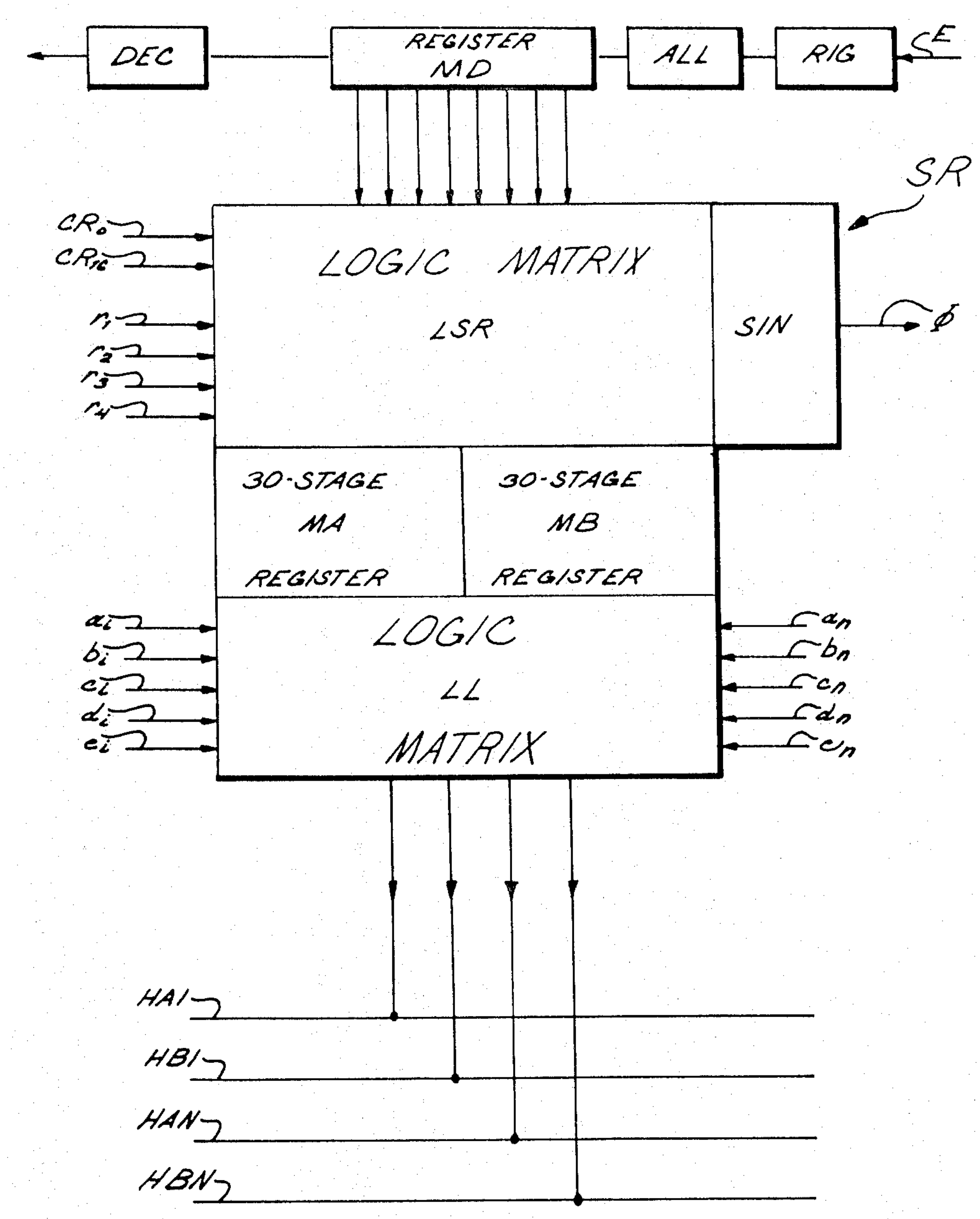
FIG. 8 shows additional circuitry supplementing that of FIG. 7.

As shown in FIG. 8, an 8-stage register MD inserted between monitor ALL and decoder DEC feeds a logic matrix LSR of storage circuit SR which reads the supervisory signals appearing in that register in the 16th channel of each frame. Matrix LSR receives timing signals $CR_0$ and $CR_{16}$ from matrix LR (FIG. 3) and is also connected to stage outputs $r_1$, $r_2$, $r_3$, $r_4$ of counter CTR. Under the control of the incoming signals, again in accordance with the preceding Table, matrix LSR loads two 30-stage registers MA and MB with the fast signals and the slow signals destined for processor EC, these signals being transferred through a logic matrix LL to leads HAI, HBI, HAN, HBN under the control of signals $a_i$–$e_i$ and $a_n$–$e_n$. Matrix LSR also works into synchronization detector SIN. The appearance of signal Φ causes a clearing of all the counters shown in FIGS. 2 and 3.

It will thus be seen that we have provided an interface network which allows the PAM side of a telecommunication system to operate in a cycle with a number of time slots different from that of the channels in a recurrent frame on the PCM side, as long as the repetition frequencies of the scanning cycle and the frame are substantially identical.

We claim:

1. In a telecommunication system, in combination:

a central office;

a multiplicity of local lines terminating at said central office;

sampling means at said central office including a set of individual capacitors respectively connected to said local lines for receiving analog message samples originating at and destined for at least some of said lines during respective time slots of a recurrent scanning cycle;

a pulse-code-modulation link with an outgoing path and an incoming path extending from said central office to a remote exchange for carrying messages to and from said local lines in a PCM frame recurring at substantially the same frequency as said scanning cycle, said frame being divided into a number of channels equal to the number of said time slots;

a coupler between said sampling means and said link with a plurality of parallel branches each including a pair of cascaded sections for the temporary storage of a message sample, one section of each branch being periodically connectable by said sampling means to the individual capacitor of an assigned local line;

a set of circuit breakers normally isolating said one section of each branch from the other section thereof;

a set of normally open transmit switches between said other section of each branch and said outgoing path;

a set of normally open receive switches between said other section of each branch and said incoming branch;

locally controlled first timing means for momentarily closing each of said circuit breakers and each of said transmit switches in staggered relationship once per scanning cycle for transferring departing message samples from said one section of any of said branches via said other section thereof to said outgoing branch;

second timing means controlled from said remote exchange via said link for momentarily closing each of said receive switches in staggered relationship once per scanning cycle for transferring arriving message samples from said incoming path to said other section of any of said branches preparatorily to delivery to a local line by way of said one section thereof, said first and second timing means having substantially the same operating frequency; and monitoring means connected to said first and second timing means for relatively phase-shifting same upon deviation of the relative closure times of said transmit and receive switches from a predetermined range, thereby maintaining an invariable closure sequence in each branch.

2. The combination defined in claim 1 wherein the number of said time slots exceeds the number of said branches, said first timing means being operative to close said circuit breakers in a time slot other than those during which said transmit switches are closed.

3. The combination defined in claim 2 wherein said branches are divided into two substantially equal groups, the circuit breakers of one group being closable in a time slot immediately preceding a series of time slots in one-half of a scanning cycle during which the transmit switches of said one group are successively closed, the circuit breakers of the other group being closable in a time slot immediately preceding a series of time slots in the other half of a scanning cycle during which the transmit switches of said other group are successively closed.

4. The combination defined in claim 3, further comprising pulse-generating means controlled by said first timing means for producing a guard signal lasting for substantially half a scanning cycle, said monitoring means including a coincidence circuit connected to said pulse-generating means and to said second timing means for respectively receiving therefrom said guard signal and a closure pulse for one of said receiver switches, said monitoring means further including phase-shifting means for said second timing means and delay means selectively insertable in said incoming path in response to a phase-shift instruction from said coincidence means.

5. The combination defined in claim 4 wherein said second timing means comprises a clock-pulse extractor in said incoming path and counting means controlled by said extractor, said phase-shifting means including a stepping circuit for said counting means.

6. The combination defined in claim 5, further comprising a digital/analog converter in said incoming path downstream of said extractor, said delay means being insertable between said extractor and said converter.

7. The combination defined in claim 6 wherein the PCM frames carried on said link form a recurrent multiframe sequence, said counting means including a frame counter and a channel counter, said stepping circuit being connected to said channel counter for resetting same by half the number of channels per frame, said stepping circuit being further connected to said frame counter for reducing the count thereof by one upon insertion of said delay means into said incoming path.

8. The combination defined in claim 7 wherein said counting means has an output generating an execution signal in a predetermined time position of one frame of said multiframe sequence, said coincidence circuit including memory means for ineffectually preserving said phase-shift instruction until the appearance of said execution signal.

9. The combination defined in claim 1, further comprising processor means for binary supervisory signals relating to the exchange of messages, and circuitry bypassing said coupler for transmitting said supervisory signals between said processor and said link.

10. The combination defined in claim 1 wherein each of said sections comprises a respective shunt condenser forming part of a tuned circuit for the resonant transfer of charges therebetween, said outgoing path including a common storage capacitor accessible to said branches through said transmit switches, said branches comprising inductances tuning said individual and common capacitors to the resonant-transfer frequency.

* * * * *